US010996748B2

(12) United States Patent
Agaoglu et al.

(10) Patent No.: US 10,996,748 B2

(45) Date of Patent: May 4, 2021

(54) GAZE-DEPENDENT DISPLAY ENCRYPTION

(71) Applicant: Apple Inc., Cupertino, CA (US)

(72) Inventors: Mehmet Agaoglu, Cupertino, CA (US); Cheng Chen, San Jose, CA (US); Harsha Shirahatti, Santa Clara, CA (US); Zhibing Ge, Los Altos, CA (US); Shih-Chyuan Fan Jiang, San Jose, CA (US); Nischay Goel, San Jose, CA (US); Jiaying Wu, San Jose, CA (US); William Sprague, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/565,298

(22) Filed: Sep. 9, 2019

(65) Prior Publication Data

US 2020/0081527 A1 Mar. 12, 2020

Related U.S. Application Data

(60) Provisional application No. 62/729,372, filed on Sep. 10, 2018.

(51) Int. Cl.

| | |
|---|---|
| ***G06F 3/01*** | (2006.01) |
| ***G06K 9/00*** | (2006.01) |
| ***G02B 27/00*** | (2006.01) |
| ***G06K 9/62*** | (2006.01) |
| ***G06K 9/32*** | (2006.01) |
| *H04L 29/06* | (2006.01) |

(52) U.S. Cl.

CPC ......... *G06F 3/013* (2013.01); *G02B 27/0093* (2013.01); *G06F 3/012* (2013.01); *G06K 9/0061* (2013.01); *G06K 9/00248* (2013.01); *G06K 9/3233* (2013.01); *G06K 9/6267* (2013.01); *H04L 29/06843* (2013.01)

(58) Field of Classification Search

CPC .......... G06F 3/013; G06F 3/012; G06F 21/32; G06F 21/57; G06K 9/00248; G06K 9/6267; G06K 9/0061; G06K 9/3233; G02B 27/0093; H04L 29/06843

USPC ...................................................... 345/8, 156

See application file for complete search history.

(56) References Cited

U.S. PATENT DOCUMENTS

| | | | | |
|---|---|---|---|---|
| 9,355,612 | B1 * | 5/2016 | Shepard | G09G 5/006 |
| 9,727,135 | B2 | 8/2017 | Sellen et al. | |
| 9,854,967 | B2 | 1/2018 | Kimura et al. | |
| 9,880,384 | B2 | 1/2018 | Wilson et al. | |

(Continued)

*Primary Examiner* — Jimmy H Nguyen

(74) *Attorney, Agent, or Firm* — Kilpatrick Townsend & Stockton LLP

(57) ABSTRACT

Aspects of the subject technology relate to gaze-dependent visual encryption of electronic device displays. Each display frame that is displayed on the electronic device display may include a clear-display region around the user's gaze location and an obscured region outside the clear-display region. In this way, only the display content that the user is actively viewing is recognizable and understandable and an onlooker such as an unwanted observer looking over the user's shoulder is unable to understand what is displayed. The obscured region of each display frame may be generated such that the overall look and structure of that region is unchanged, but the content is unintelligible. In this way, the visual experience of the user is not disrupted or distracted by the visual encryption and the eye of the onlooker is not guided to the clear-display region by the visual encryption.

20 Claims, 10 Drawing Sheets

(56) References Cited

U.S. PATENT DOCUMENTS

| | | | | |
|---|---|---|---|---|
| 10,013,053 | B2 | 7/2018 | Cederlund et al. | |
| 10,063,560 | B2 | 8/2018 | Gordon et al. | |
| 10,324,528 | B2 | 6/2019 | Cederlund et al. | |
| 2009/0273562 | A1* | 11/2009 | Baliga | G06F 3/013 345/157 |
| 2010/0091200 | A1* | 4/2010 | Vigouroux | H04N 9/3155 348/756 |
| 2012/0290401 | A1 | 11/2012 | Neven | |
| 2015/0178889 | A1* | 6/2015 | Michel | G06T 3/40 382/298 |

* cited by examiner

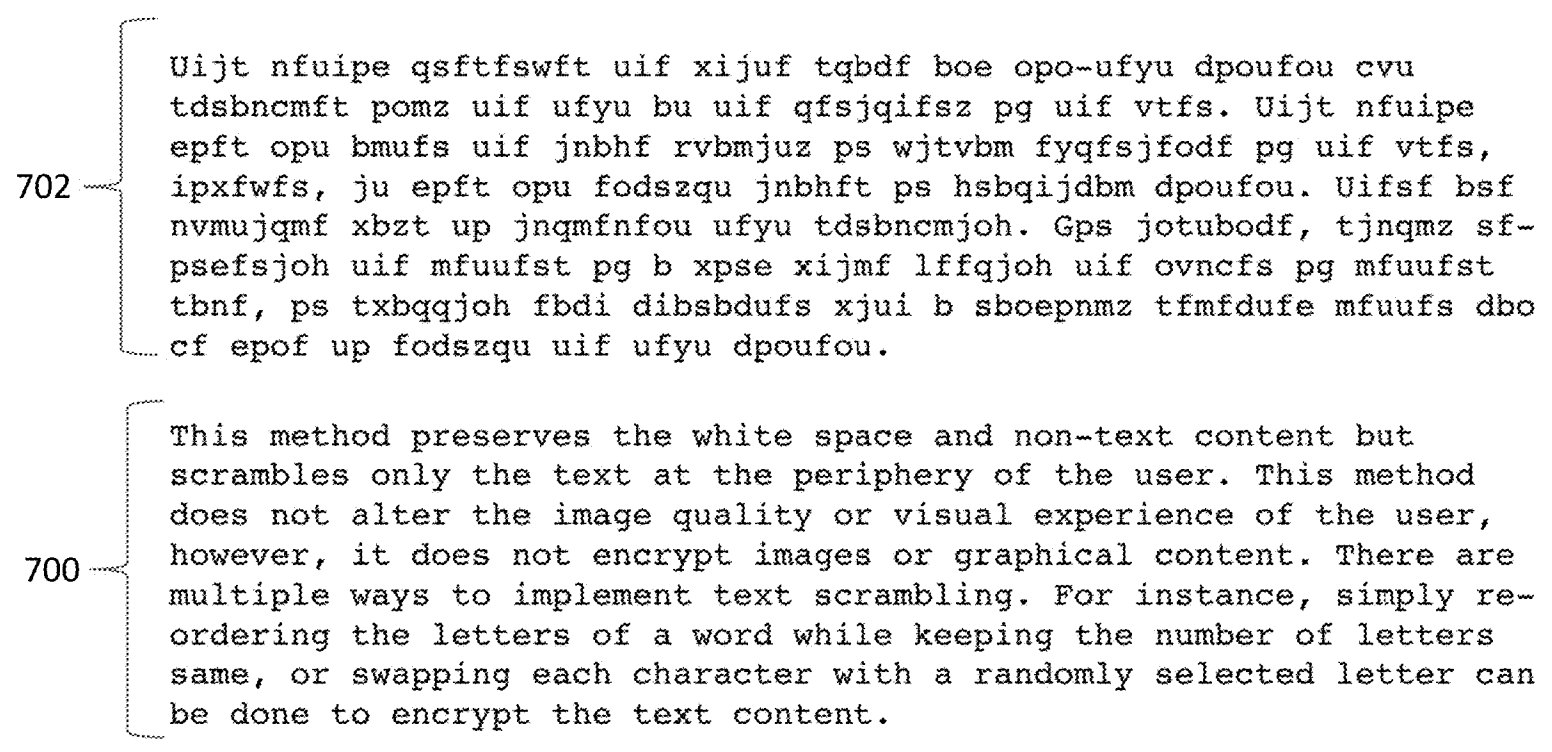

702

Uijt nfuipe qsftfswft uif xijuf tqbdf boe opo-ufyu dpoufou cvu tdsbncmft pomz uif ufyu bu uif qfsjqifsz pg uif vtfs. Uijt nfuipe epft opu bmufs uif jnbhf rvbmjuz ps wjtvbm fyqfsjfodf pg uif vtfs, ipxfwfs, ju epft opu fodszqu jnbhft ps hsbqijdbm dpoufou. Uifsf bsf nvmujqmf xbzt up jnqmfnfou ufyu tdsbncmjoh. Gps jotubodf, tjnqmz sf-psefsjoh uif mfuufst pg b xpse xijmf lffqjoh uif ovncfs pg mfuufst tbnf, ps txbqqjoh fbdi dibsbdufs xjui b sboepnmz tfmfdufe mfuufs dbo cf epof up fodszqu uif ufyu dpoufou.

700

This method preserves the white space and non-text content but scrambles only the text at the periphery of the user. This method does not alter the image quality or visual experience of the user, however, it does not encrypt images or graphical content. There are multiple ways to implement text scrambling. For instance, simply re-ordering the letters of a word while keeping the number of letters same, or swapping each character with a randomly selected letter can be done to encrypt the text content.

FIG. 7

GAZE-DEPENDENT DISPLAY ENCRYPTION

CROSS-REFERENCES TO RELATED APPLICATIONS

The present application claims the benefit of and priority to U.S. Provisional Application. No. 62/729,372, filed Sep. 10, 2018, the entire contents of which are incorporated herein by reference for all purposes.

BACKGROUND

Portable electronic devices such as laptop computers, cellular telephones, and tablet computers are often provided with displays for displaying visual information. These portable devices are often used to view content that is private, confidential, or even classified. However, when these devices are used in public spaces such as cafes, trains, buses, airplanes, airports, or the like, there is a risk that the private, confidential or classified information could be viewed by an unwanted observer looking at the user's display.

Privacy screens are available for mounting over the device display that prevent viewing of the display at large angles. However, these screens are typically bulky, separate devices that must be carried with the electronic device, mounted to the device when privacy is desired, and can be easily forgotten or lost. Moreover, these screens negatively impact the viewing quality of the display for the user (i.e., causing color shifts, reduced luminance, and changes with head or device movement), are ineffective for unwanted observers standing or sitting directly behind the user, and clearly indicate to others around the user that private, potentially interesting or valuable content is being displayed, (which can create an unwanted incentive to attempt to view the content).

BRIEF DESCRIPTION OF THE DRAWINGS

Certain features of the subject technology are set forth in the appended claims. However, for purpose of explanation, several embodiments of the subject technology are set forth in the following figures.

FIG. 7 illustrates an example of visually encrypted text that maintains the layout of the text but obscures the meaning of the text in accordance with various aspects of the subject technology.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

The subject disclosure provides visual encryption systems and methods that dynamically update display frames such that display content at the user's viewing location is clearly displayed and display content at the user's viewing periphery is obscured in a way that is unintelligible to an unwanted onlooker at any viewing angle but not distracting or noticeable to the user. In this way, the user's privacy is protected without distracting the user and without indicating to others that private information is being displayed.

In accordance with various aspects of the subject technology, the visual encryption described herein is a gaze-dependent visual encryption that is based on the location of the user's gaze on the display. The user's gaze location can be determined using one or more cameras and/or other sensors that sense the direction in which the user's eyes are looking. The gaze-dependent visual encryption systems and methods described in further detail hereinafter provide unobscured content in a clear-viewing region around the user's gaze location and obscured content outside of that clear-viewing region. The obscured content may be generated in a way that does not cause the user to notice the obscuration and that prevents the obscuration itself from visually indicating the location of the clear-viewing region to other observers or onlookers. In accordance with some aspects, the gaze-dependent visual encryption may be further based on the presence and/or gaze location of one or more onlookers.

Figure 1:
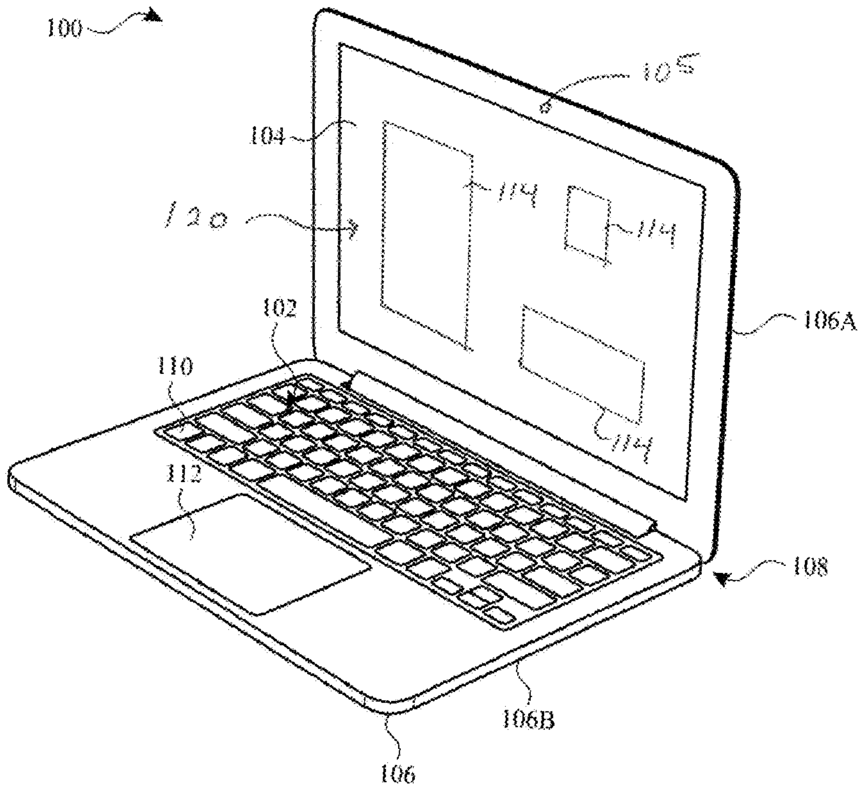
FIG. 1 illustrates a perspective view of an example electronic device having a display in accordance with various aspects of the subject technology.

An illustrative electronic device having a display is shown in FIG. 1. In the example of FIG. 1, device 100 has been implemented in the form of a portable computer. As shown in FIG. 1, device 100 may include keyboard 102 with keys

110, display 104, housing 106, and a touch pad such as touch pad 112. As shown in FIG. 1, display 104 may be mounted on the front of housing 106.

Housing 106, which may sometimes be referred to as a case, may be formed of plastic, glass, ceramics, fiber composites, metal (e.g., stainless steel, aluminum, etc.), other suitable materials, or a combination of any two or more of these materials. Housing 106 may be formed using a unibody configuration in which some or all of housing 106 is machined or molded as a single structure or may be formed using multiple structures (e.g., an internal frame structure, one or more structures that form exterior housing surfaces, etc.). As shown in FIG. 1, housing 106 may have multiple parts. For example, housing 106 may have upper portion 106A and lower portion 106B. Upper portion 106A may be coupled to lower portion 106B using a hinge that allows portion 106A to rotate about rotational axis 108 relative to portion 106B. Keyboard 102 and touch pad 112 may be mounted in lower housing portion 106B, in some implementations.

Display 104 may be a touch screen that incorporates capacitive touch electrodes or other touch sensor components or may be a display that is not touch-sensitive. Display 104 may include display pixels formed from light-emitting diodes (LEDs), organic light-emitting diodes (OLEDs), plasma cells, electrophoretic display elements, electrowetting display elements, liquid crystal display (LCD) components, or other suitable display pixel structures. Display 104 may have openings (e.g., openings in the inactive or active portions of display 104) such as an opening to accommodate a button or one or more cameras such as camera 105. Camera 105 and/or other cameras disposed around or behind the display may be operated by device 100 to capture images of the user's face and/or the user's surroundings and within the camera's field of view.

Images captured by camera 105 and/or other cameras (e.g., cameras located at or near the corners of display 104) may be processed by processing circuitry within device 100 to detect the user's eyes and determine the direction of the user's gaze relative to the camera and display 104, to determine the user's gaze location on the display or away from the display. The images from camera 105 and/or other cameras may also be processed to identify the presence of others (e.g., onlookers or potential onlookers) around the user such as unwanted observers of the device display. The images from camera 105 and/or other cameras may also be processed to identify the gaze location(s) of one or more others around the user on the display or away from the display. The images from camera 105 and/or other cameras may also be processed using facial recognition operations to determine the identity of and/or authenticate the primary user.

The processor of device 100 visually encrypts the content displayed on the display based on the identified user gaze location and/or based on the presence or gaze location of the any onlookers. Camera 105 and the associated processing circuitry may be configured to track the gaze location and motion of the user's eyes and/or one or more onlookers with or without additional head-mounted sensors (as desired), with an eye-tracking latency of, for example, 16 milliseconds (ms), four ms, or less than four ms, with an eye-tracking accuracy of, for example, less than two degrees, with an eye-tracking precision of less than, for example, one degree, and with an eye tracking sampling rate of, for example, 120 Hz or more. For display of gaze-dependent visually encrypted display frames, display 104 may be operated at a frame rate of, for example, 60 Hz, 90 Hz, 120 Hz, more than 120 Hz, or any other suitable fixed frame rate or variable frame rate (e.g., a variable frame rate depending on the type of content being displayed and/or where the user is looking).

The configuration of electronic device 100 of FIG. 1 is merely illustrative. In other implementations, electronic device 100 may be a computer such as a computer that is integrated into a display such as a computer monitor, a laptop computer, a tablet computer, a somewhat smaller portable device such as a wrist-watch device, pendant device, or other wearable or miniature device, a media player, a gaming device, a navigation device, a computer monitor, a television, or other electronic equipment. In various configurations, device 100 may be communicatively coupled to one or more cameras that are separate from the device.

As shown in FIG. 1 a display frame 120 may be displayed by display 104 (e.g., by operating each of an array of display pixels according to corresponding digital pixel values in the display frame). In the example of FIG. 1, display frame 120 represents display content including three application display windows 114. For example, each of application display windows 114 may be a user interface window of a word processor, a compiler, a presentation editor, a spreadsheet, an image viewer, a file manager, a web browser, a video player, an audio player, or the like. In some cases, the user of device 100 may desire to prevent others (referred to herein as onlookers or unwanted observers) from viewing some or all of display frame 120. For example, the user may be using one or more of application display windows 114 to view private or confidential documents or to compose private or confidential text. More generally, the user may simply desire to prevent others from seeing the display frame, even if the display content is not private or confidential (e.g., if the user is watching a movie).

The desire or need to prevent others from viewing display frame 120 can be particularly important or strong when the user is in a public place such as a cafe or an airplane. Accordingly, device 100 can visually encrypt display frame 120 for display. However, because the user still desires to be able to view and understand the display content in the visually encrypted display frame that the user is currently viewing, a gaze-dependent visually encrypted display frame 120E can be displayed, as illustrated in FIG. 2.

Figure 2:
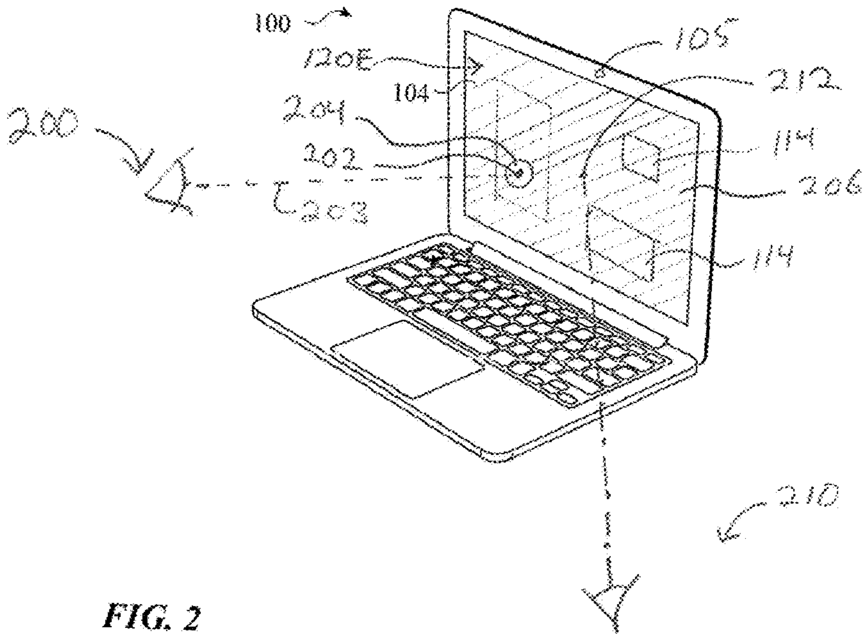
FIG. 2 illustrates a perspective view the electronic device of FIG. 1 displaying gaze-dependent visually encrypted content in accordance with various aspects of the subject technology.

As shown in FIG. 2, the gaze 203 of a user such as user 200 may fall on a gaze location 202 on the display. Images of user 200 captured by camera 105 may be used to determine gaze location 202 (e.g., in terms of the coordinates of a pixel or group of pixels of the display). Based on the determined gaze location 202, a gaze-dependent visually encrypted display frame 120E may be generated to include a clear-display region 204 around gaze location 202 and an obscured region 206 outside the clear-display region 204. In the clear-display region 204, the display content is displayed unmodified for clear viewing by the user. In obscured region 206, the display content and/or the display frame itself (e.g., the display pixel values) is visually encrypted so that an onlooker such as onlooker 210 viewing the display (e.g., at an onlooker gaze location 212 that can also be determined using images from camera 105) can see the display frame, but cannot clearly view or understand the display content at that location.

Moreover, the obscured region 206 of gaze-dependent visually encrypted display frame 120E is obscured using one or more of the visual encryption operations described herein that prevent onlooker 210 from clearly viewing or understanding the display content without creating a visual distraction to the user and without guiding the onlooker's eye to clear-display region 204, even as the gaze location 202 of the user (and accordingly the clear-display region 204) moves around the display. For example, in FIG. 2, the presence and location of the three application display windows 114 can still be identified even though the content of these windows in obscured region 206 is obscured.

For example, simply blurring (e.g., by down-sampling the display pixel values in obscured region 206) may cause noticeable changes in the user's peripheral view as the user's eyes move and/or may create a moving clear-display region that is easily located by an onlooker (e.g., by modifying the presence and location of windows 114 so severely that the user's peripheral vision detects the change). Accordingly, in accordance with various aspects of the subject disclosure, the obscured region 206 of gaze-dependent visually encrypted display frame 120E may be obscured using scrambling operations, perceptual metamer operations, and/or diffeomorphic warping operations that prevent onlooker 210 from clearly viewing or understanding the display content in obscured region 206, without creating a visual distraction to the user and without guiding the onlooker's eye to clear-display region 204. Further details of text scrambling operations, perceptual metamer operations, and diffeomorphic warping operations are provided hereinafter (e.g., in connection with FIGS. 7 and 8).

In some cases, a privacy mode for display 104 may be always enabled so that all display frames are gaze-dependent visually encrypted display frames. In other cases (e.g., to reduce power consumption by the display), the privacy mode may be enabled automatically when an onlooker or potential onlooker is detected (e.g., by obtaining onlooker information using images from camera 105). For example, camera 105 may be operated to check the scene around user 200 and/or display 104 (e.g., every second or more or less frequently) and report how many faces are detected in the scene. If the number of detected faces exceeds one, indicating the presence of potential onlooker, the privacy mode is enabled and gaze-dependent visually encrypted display frames are provided.

In another example, the privacy mode may only be enabled when the potential onlooker is looking at an onlooker gaze location that is on the display. In scenarios in which the user's gaze location 202 moves off of the display, the entire display frame may be visually encrypted or the display may be darkened or powered down until the user's gaze location returns to the display. In some scenarios, the entire display frame may be visually encrypted and/or an alert may be provided when the onlooker gaze location is within clear-display region 204.

Figure 3:
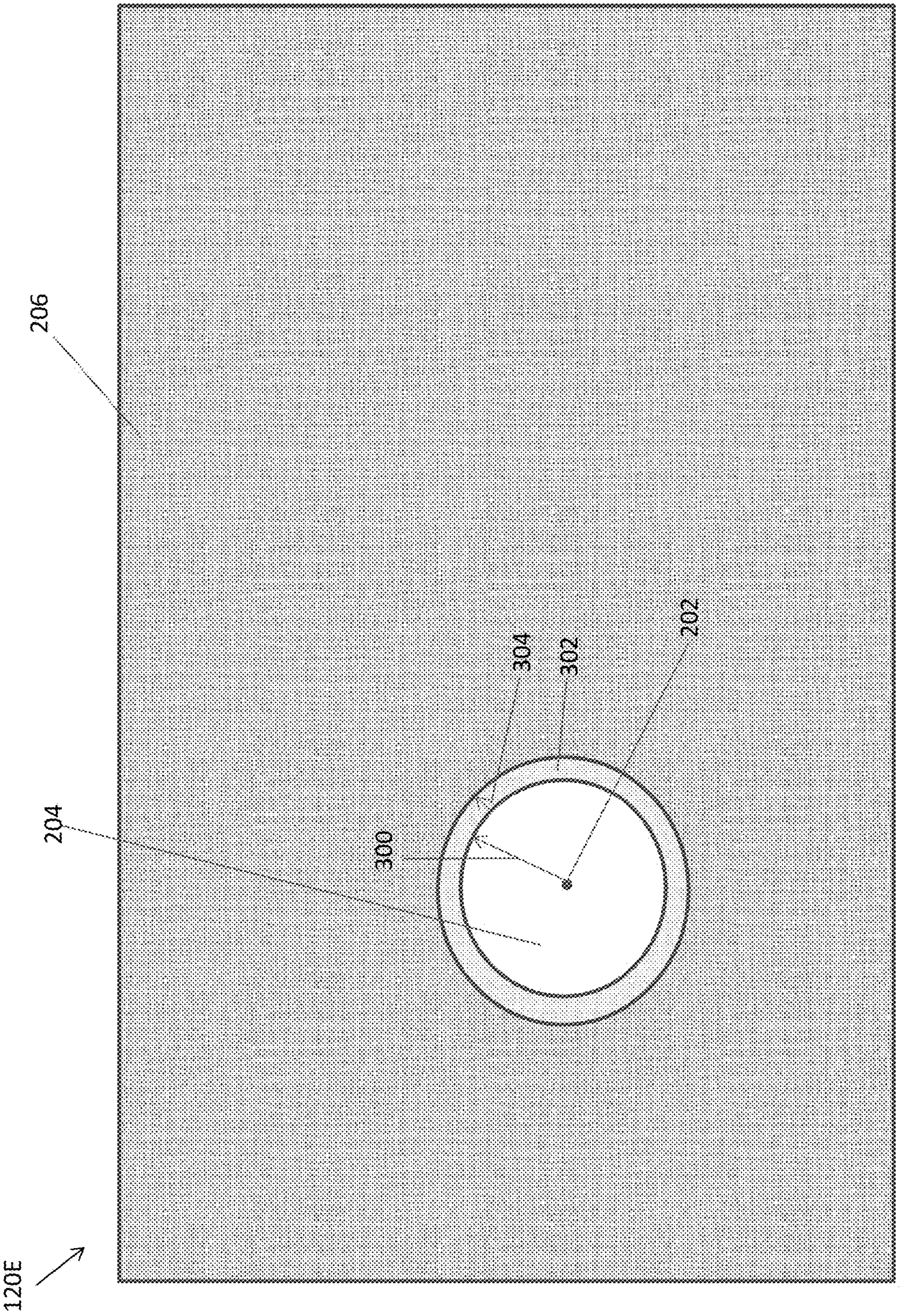
FIG. 3 illustrates an example of a gaze-dependent visually encrypted display frame in accordance with various aspects of the subject technology.

In the example of FIG. 2, clear-display region 204 is a circular region around gaze location 202. FIG. 3 shows how a circular clear-display region 204 may extend to a radial distance 300 from gaze location 202. In the example of FIG. 3, a transition region 302 is also provided that extends an additional distance 304 between clear-display region 204 and obscured region 206 to further prevent visual distraction to the user at the boundary between clear-display region 204 and obscured region 206 and to further prevent onlooker 210 from being guided to clear-display region 204. The encryption level of the display content in transition region 302 may gradually increase with distance from clear-display region 204 to avoid sudden, potentially visible changes at the boundary. For example, FIG. 4 illustrates a scenario in which scrambling (or other visual encryption described herein) is applied with an increasing weight in transition region 302 with increasing distance from clear-display region 204 (and gaze location 202).

However, it should be appreciated that in some scenarios, gaze-dependent visually encrypted display frame 120E may be provided without a transition region 302 or with a transition region 302 that is not uniformly surrounding clear-display region 204. For example, the transition region 302 may extend further beyond clear-display region 204 in directions parallel to the direction of movement of the user's gaze than in directions perpendicular to the user's gaze motion.

Figure 4:
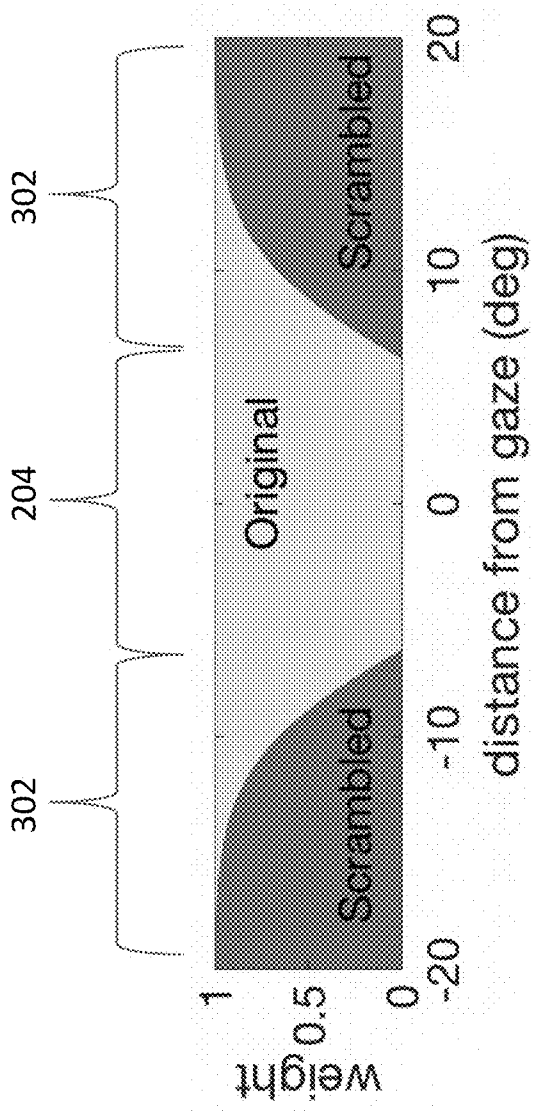
FIG. 4 illustrates an example of encryption weighting for a transition region between a clear-display region and an obscured region of a display frame in accordance with various aspects of the subject technology.

It should also be appreciated that the circular shape of clear-display region 204 in FIGS. 2-4 is merely illustrative and other shapes may be used. The shape and size of clear-display region 204 (e.g., including the distance 300 from gaze location 202) can be determined automatically (e.g., based on the distance of user 200 from display 104 as determined using images from camera 105 and/or other sensors, based on the size of the display, based on the type of content being displayed, based on a privacy level for the display content, and/or based on user activity such as eye movements or scrolling) or can be user selected.

Figure 5:
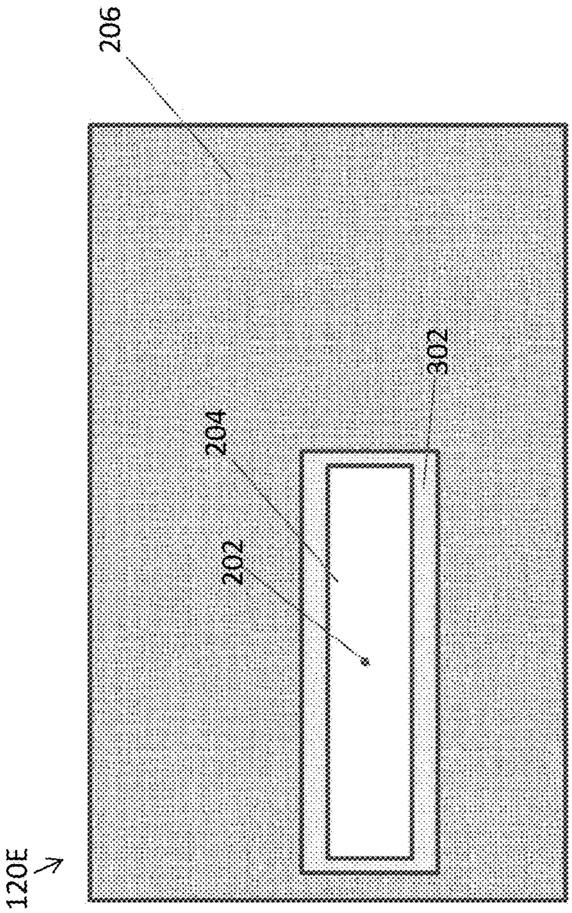
FIG. 5 illustrates an example of a gaze-dependent visually encrypted display frame having a horizontally extended clear viewing region in accordance with various aspects of the subject technology.

For example, FIG. 5 shows an example in which gaze-dependent visually encrypted display frame 120E includes a horizontally extended clear-display region 204 having a width that is larger than the height. The horizontal direction may, for example, be direction that is parallel to the direction of displayed line(s) of text or to top or bottom edges of the display or displayed windows 114. Horizontally extended clear-display region 204 may be used, for example, when it is determined that the user is reading text. For example, gaze location 202 may be at a location at which text is displayed and/or the motion (movement) of gaze location 202 may indicate reading eye movement such as back-and-forth horizontal eye movement.

Figure 6:
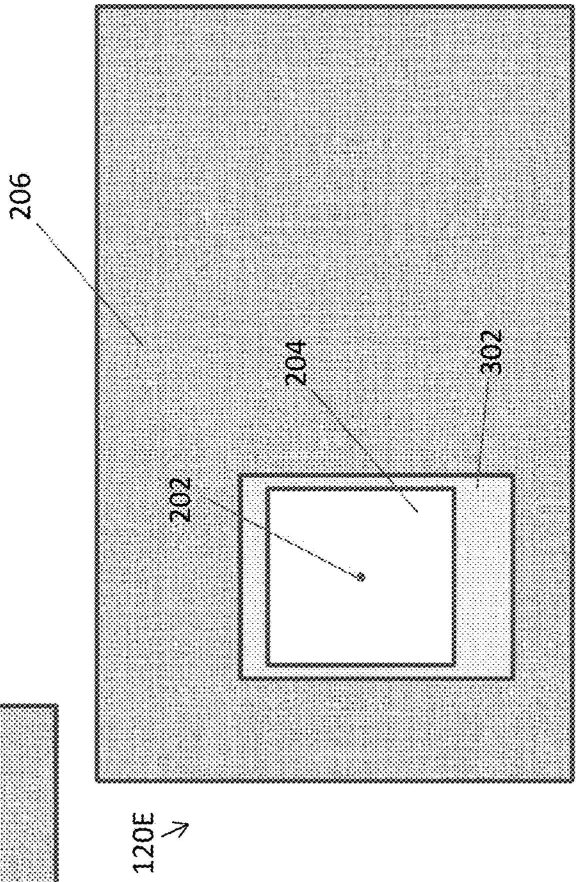
FIG. 6 illustrates an example of a gaze-dependent visually encrypted display frame having a vertically extended clear viewing region in accordance with various aspects of the subject technology.

FIG. 6 shows another example in which gaze-dependent visually encrypted display frame 120E includes a vertically extended clear-display region 204 having a height that is larger than the width. The vertical direction may, for example, be direction that is perpendicular to the direction displayed line(s) of text or parallel to left and right edges of the display or displayed windows 114. Vertically extended clear-display region 204 may be used, for example, when it is determined that the user is viewing scrolling content. For example, the scrolling content may be identified based on up-and-down vertical eye movement and/or based on user input on a touch-screen, touch pad, or mouse that causes the display content to scroll. In the example of FIG. 5, transition region 302 extends further from a bottom edge of clear-display region 204 than from the top edge of clear-display region 204. In this example, the user may be scrolling down a web page or document and the extended distance of transition region 302 in that direction may help prevent visually distracting changes at the boundary of region 204 as the display content is scrolled. The size, shape, and/or location of clear-display region 204 and/or transition region 302 may be adjusted with every move of gaze location 202 or can be adjusted based on a smoothed (e.g., time-averaged) gaze location to prevent rapid changes with rapid eye movements associated with viewing of video or other moving or scrolling content).

Examples of visual encryption operations that may be performed to generate gaze-dependent visually encrypted display frame 120E will now be described. As a first example of visual encryption operations, text scrambling operations are described. In accordance with various aspects of the subject disclosure, there are multiple ways to implement text scrambling. For instance, simply reordering the letters of a word while keeping the number of letters same, or swapping each character with a randomly selected letter can be performed to visually encrypt the text content. However, since the gaze-dependent visual encryption disclosed herein is intended to work with eye/gaze tracking in real time, gaze-dependent visual encryption may be performed at every display frame. Accordingly, random reordering or swapping creates dynamic changes on the display, and the peripheral text in obscured region 206 may appear flickering or vibrating. This potentially visually distracting effect for the user can be mitigated, for instance, by using a deterministic, rather than random, swapping operation in which each character to be displayed in obscured region 206 is replaced by another character whose ASCII code or Unicode representation is a fixed distance from the original character.

FIG. 7 shows an example of scrambling of text in the display content to be displayed that can be performed to preserve the white space and non-text content even in the obscured region of a display frame, to visually encrypt only the text at the periphery of the user. The example of FIG. 7 demonstrates how, for example, a single shift in ASCII codes can be used to hide the meaning of text content without changing the shape or the white space of the displayed text. In particular, a paragraph 700 that is to be displayed is shown in its original text in Courier font. A visually encrypted version 702 of paragraph 700 is also shown with each letter replaced with its immediate neighbor in the ASCII domain (e.g., 'a' is replaced with 'b', 'm' is replaced by 'n', etc.). In this example, white space and punctuation marks were not modified to preserve the general look of the paragraph. Paragraph 700 may be displayed in clear-display region 204 and visually encrypted paragraph 702 may be displayed when the gaze location 202 moves such that the paragraph is location in obscured region 206.

In another example, text scrambling can be limited to within-word shuffling of letters to avoid the visual distraction to the user. Within-word shuffling operations keep the number and identity of characters within a word the same but their order is modified. Due to the lower visual acuity of user 200 in the periphery and visual crowding (e.g., impaired recognition due to nearby clutter), the scrambled text in the periphery does not disrupt the visual experience in this example.

Text scrambling/shuffling as described can be implemented to run in, for example, real-time speeds but may also include operations for segmentation of text objects on the display. Text scrambling operations as described do not alter the image quality or visual experience of the user, but also do not encrypt images or graphical content. Accordingly, perceptual metamer operations and/or diffeomorphic warping operations may be performed in combination with, or in alternative to text scrambling operations.

With respect to perceptual metamers, it is noted that human peripheral vision is limited compared to foveal or central vision, due to the non-homogeneous distribution of photoreceptors and the receptive fields of retinal ganglion cells across the retina. This is evident in reduced visual acuity with eccentricity. Recognition and identification of objects that are presented in the periphery of a human visual field is further limited when the object of interest is surrounded by or presented close to other objects. This deleterious effect of visual clutter on recognition is referred to as crowding.

Crowding can be observed in the fovea but is much stronger in the periphery of the visual field. Crowding may occur due to, for example, spatial pooling or averaging, position uncertainty, object substitution, low attentional resolution, etc. in human visual sensing and processing. When crowding occurs, it does not impair the ability of the observer to detect the presence of an object, it only impairs the ability to recognize or identify that object.

Crowding in human vision can be used for visual encryption in the user's periphery (e.g., for obscured region 206 of a display frame) by generation of perceptual metamers. Two visual stimuli are metamers of each other if they are perceptually indistinguishable, even though they are physically different. Metamerism can be achieved for stimuli that are viewed peripherally, however, it is very difficult to obtain metamerism for foveally presented stimuli. In accordance with aspects of the subject disclosure, metamers of the peripheral portions of display frame can be generated and used in obscured region 206 to scramble or visually encrypt fine details, such as text and/or details in an image or figure, while keeping the overall visual structure similar to the original, thus leaving the visual experience of the user unaffected. In this way, perceptual metamers of the original content associated with obscured region 206 can be provided to visually encrypt the meaning of the content while not impairing the perceived image quality for the user.

Perceptual metamers for obscured region 206 of display frame 120E can be generated by extracting image statistics from the original display frame 120, pseudo-randomly generating an initial seed image, and iteratively modifying the initial seed image until the image statistics of the seed image match the image statistics extracted from the original display frame. In some perceptual metamer operations for generating perceptual metamers of a portion of a display frame, machine learning operations that train a neural network to quickly synthesize metamers can be applied to quickly generate the metamers. Further reduction in computation time can be obtained by generating metamerism only in the luminance component of a color display frame. However, particularly when high frame rates with changing display frames are used for display, it can be challenging to generate perceptual metamers for each display frame, within the frame time for each frame.

Accordingly, in some scenarios, text scrambling and/or perceptual metamers can be replaced with or combined with diffeomorphic warping of portions of display frame 120 to generate obscured region 206 of gaze-dependent visually encrypted display frame 120E.

Figure 8:
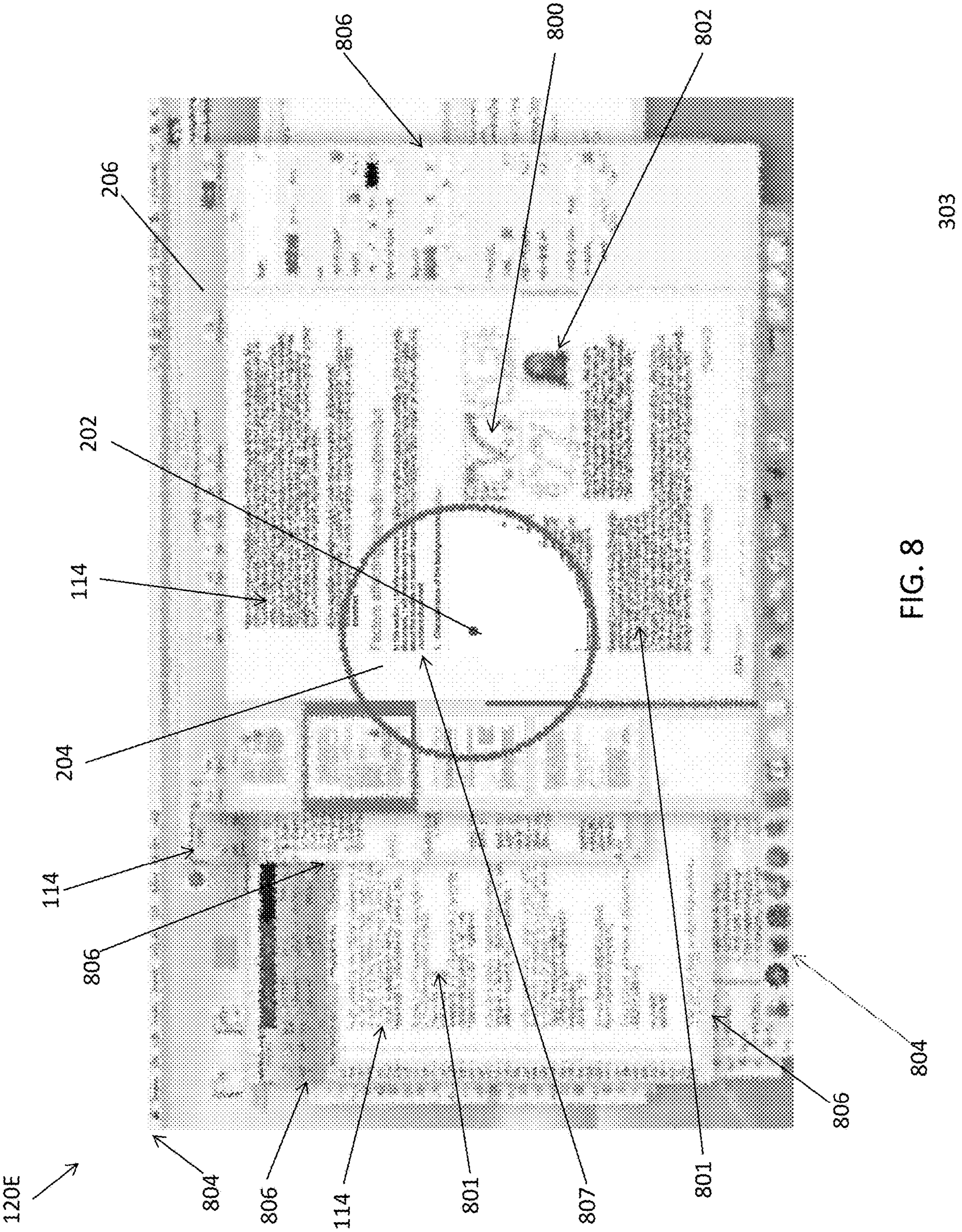
FIG. 8 illustrates a schematic diagram of gaze-dependent visually encrypted display content including text, application content, and graphical information in accordance with various aspects of the subject technology.

Diffeomorphic warping is a continuous, invertible, smooth transformation of an image such that the global perceptual properties of the image can be preserved while the content of the image is rendered unrecognizable to a human observer. FIG. 8 shows an example of gaze-dependent visually encrypted display frame 120E in which obscured region 206 has been generated using diffeomorphic warping. Depending on the spatial scale and granularity of the diffeomorphic warping transformation, different types of content (e.g., text 801, images 802, data plots 800, and/or other display content) can be sufficiently scrambled in obscured region 206 to visually encrypt the meaning of that content while preserving the overall structure of that content. For example, in FIG. 8, the content in obscured region 206 is not recognizable even when viewed directly, yet when viewed with peripheral vision, this diffeomorphed content appears similar to the original. For example, the presence and location of application windows 714, including the straight edges 806 of these windows, and the color and overall appearance of the content in and around these windows is preserved. Diffeomorphic warped content as described may yield similar patterns of neuronal firing rates in the early visual system of humans to the original content. As shown, the presence, location, and overall structure and color of system icons and controls 804 is also preserved, although in some implementations these generic system icons may be provided for display without visual encryption. Text 807 in clear-display region 204 is unmodified for clear display.

In comparison with the generation of perceptual metamers, diffeomorphic warping for obscured region 206 can be computed very quickly (e.g., less than one ms or less than 28 ms for a 1920×1080 RGB image). Diffeomorphic warping operations for generation of obscured region 206 in various display frames can be integrated into the display pipeline (e.g., as a part of a SoC), for all display frames or only when there is a change in the display content between display frames (e.g., when the user interacts with the user interface (UI) by typing, clicking, scrolling, etc., or when a dynamic content such as a movie is being displayed). Another advantage of this diffeomorphic warping is that diffeomorphic warping operations can be performed without segmentation of the display content or display frame into text, image, UI elements, etc., and can be dynamically adjusted for different types of content.

Diffeomorphic warping, in some implementations, includes iterative warpings of a display frame based on a cosine-based expansion of a warp map including six cosine base components. However, this is merely illustrative and in some implementations, the diffeomorphic warping is performed using a variable number of cosine base components, the number of base components varying the look of obscured region 206, and/or using a range of random or pseudo-random spatial frequencies in the warp map. Because the encryption described herein is for visual obscuration of display frames while the user is viewing the display, gaze-dependent visually encrypted display frames may be generated and displayed without storing the gaze-dependent visually encrypted display frames outside the display (e.g., other than temporary storing in buffer circuitry for active display operations).

Text scrambling, perceptual metamers, diffeomorphic warping, and/or down-sampling can be used alone or in any combination to enhance the perceived viewing quality for the user and to achieve the desired level of privacy when generating a gaze-dependent visually encrypted display frame.

Figure 9:
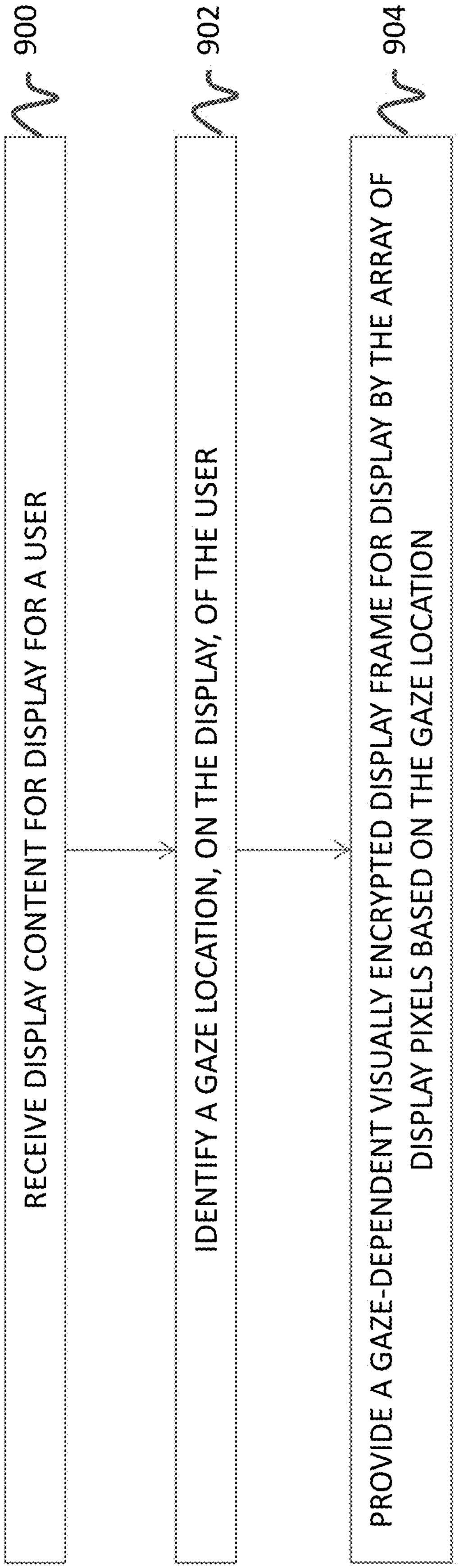
FIG. 9 illustrates a flow chart of an example process for gaze-dependent visual encryption in accordance with various aspects of the subject technology.

FIG. 9 depicts a flow diagram of an example process for providing gaze-dependent visually encrypted content for display in accordance with various aspects of the subject technology. For explanatory purposes, the example process of FIG. 9 is described herein with reference to the components of FIG. 1. Further for explanatory purposes, the blocks of the example process of FIG. 9 are described herein as occurring in series, or linearly. However, multiple blocks of the example process of FIG. 9 may occur in parallel. In addition, the blocks of the example process of FIG. 9 need not be performed in the order shown and/or one or more of the blocks of the example process of FIG. 9 need not be performed.

In the depicted example flow diagram, at block 900, display content for display for a user may be received. The display content for display may be received at the display from system circuitry for the device or at the system circuitry from an application running on the device (as examples).

At block 902, device 100 identifies a gaze location, on the display, of the user. Identifying the gaze location may include capturing one or more images of the user with one or more cameras such as camera 105, identifying the user's eyes, determining the distance of the user's eyes from the display, determining a direction of the user's gaze based on the identified eyes, and determining the location of the user's gaze based on the determined direction and distance. The gaze location may, for example, correspond to a location of a pixel or group of pixels on the display.

At block 904, device 100 provides a gaze-dependent visually encrypted display frame for display by the array of display pixels based on the gaze location. The gaze-dependent visually encrypted display frame may include a first portion of the display content to be displayed within a distance of the gaze location and unmodified for clear display, and a second portion of the display content, to be displayed outside the distance of the gaze location and modified for secure display. For example, the gaze-dependent visually encrypted display frame may include a clear-display region 204, an obscured region 206, and/or a transition region 302 as described above in connection with any of FIGS. 3-8. For example, the display content in the obscured region may be visually encrypted by performing text scrambling operations, perceptual metamer operations, and/or diffeomorphic warping operations as described herein.

Display 104 may include column driver circuitry that drives data signals (analog voltages) onto data lines of an array of display pixels that illuminate to display each display frame. Display 104 may also include gate driver circuitry to drive gate line signals onto gate lines of the array. Using the data lines and gate lines, the display pixels may be operated to display desired display content on display 104 for a user.

Device 100 may include system circuitry such as processor(s) 1212, storage 1202, system memory 1204, and/or ROM 1210 of FIG. 12 below. During operation of device 100, the system circuitry may generate or receive display content that is to be displayed on display 104. For example, the display content may include video frames, still images, application display windows 114, text, or any other content for display. The display content may be processed, scaled, modified, visually encrypted and/or provided to display control circuitry such as a graphics processing unit (GPU) for the display. For example display frames, each including display pixel values (e.g., each corresponding to a grey level) for display using the display pixels of display 104 (e.g., colored subpixels such as red, green, and blue subpixels) may be provided from the system circuitry 208 to the GPU. The GPU may process the display frames and provide processed display frames to a timing controller integrated circuit that provides digital display data (e.g., the digital pixel values each corresponding to a grey level for display) to the column driver circuitry for operation of the display pixels to display each display frame.

The graphics processing unit and timing controller may sometimes collectively be referred to herein as display control circuitry. Display control circuitry may be used in controlling the operation of display 104. Display control circuitry may sometimes be referred to herein as a display driver, a display controller, a display driver integrated circuit (IC), or a driver IC. The graphics processing unit and timing controller may be formed in a common package (e.g., an SOC package) or may be implemented separately (e.g., as separate integrated circuits). In some implementations, a timing controller may be implemented separately as a display driver, a display controller, a display driver integrated circuit (IC), or a driver IC that receives processed display data from a graphics processing unit. Accordingly, in some implementations, graphics a processing unit may be considered to be part of the system circuitry that provides display data to the display control circuitry (e.g., implemented as a timing controller, gate drivers, and/or column drivers).

Gaze-dependent visually encrypted display frames may be generated by encrypting the display content before display frames are generated and/or by modifying previously generated display frames corresponding to the display content by modifying the pixel values of the display frames. Accordingly, providing a gaze-dependent visually encrypted display frame may include modifying an existing display frame (e.g., using display control circuitry at the display) or by modifying the display content (e.g., using system circuitry) prior to providing gaze-dependent visually encrypted display frames to the display.

Figure 10:
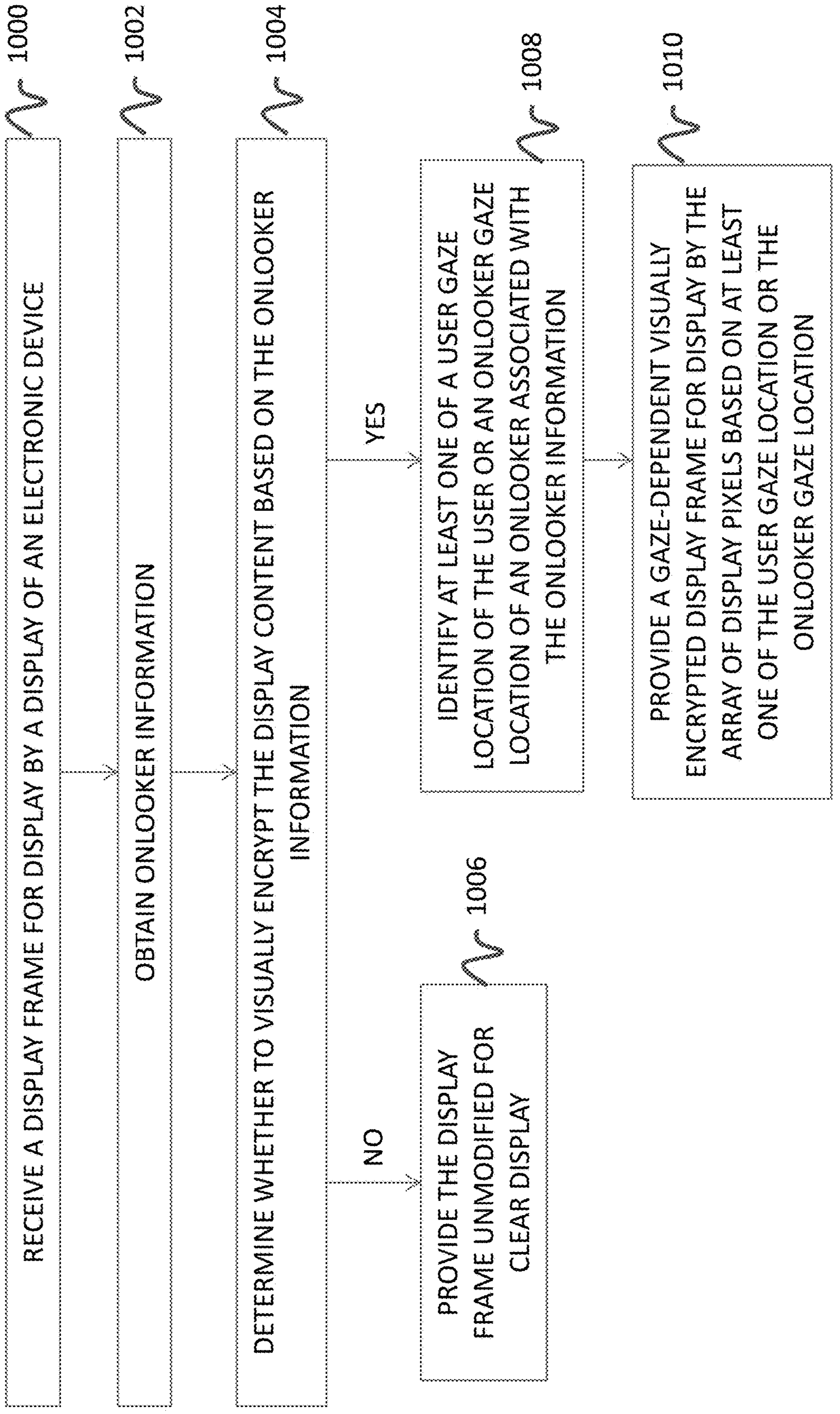
FIG. 10 illustrates a flow chart of an example process for gaze-dependent visual encryption based on onlooker information in accordance with various aspects of the subject technology.

FIG. 10 depicts a flow diagram of an example process for providing gaze-dependent visually encrypted content for display in accordance with various aspects of the subject technology. For explanatory purposes, the example process of FIG. 10 is described herein with reference to the components of FIG. 1. Further for explanatory purposes, the blocks of the example process of FIG. 10 are described herein as occurring in series, or linearly. However, multiple blocks of the example process of FIG. 10 may occur in parallel. In addition, the blocks of the example process of FIG. 10 need not be performed in the order shown and/or one or more of the blocks of the example process of FIG. 10 need not be performed.

In the depicted example flow diagram, at block 1000, display content for display for a user may be received. The display content for display may be received at the display from system circuitry for the device or at the system circuitry from an application running on the device (as examples).

At block 1002, onlooker information may be obtained. The onlooker information may be obtained by processing one or more images captured by one or more cameras such as camera 105 to determine whether any potential onlookers are present in the environment of the user. Potential onlookers may be identified when a person, other than the user, is identified within viewing distance of display 104 (e.g., within the field of view of at least one camera). The viewing distance may be defined by a linear distance of less than, for example, ten feet, five feet, three feet or another distance within the hemisphere, or a predefined portion thereof, defined by a plane of the emitting surface of display. The onlooker information may also include an onlooker gaze location of any identified potential onlooker. For example, the onlooker information may include a binary indicator of whether the onlooker gaze location is anywhere on the display or a particular pixel location of the onlooker gaze location.

At block 1004, device 100 determines whether to visually encrypt the display content based on the onlooker information. For example, device 100 may determine that the display content is to be visually encrypted when the onlooker information indicates the presence of at least one onlooker or potential onlooker. As another example, device 100 may determine that the display content is to be visually encrypted when the onlooker information indicates the presence of at least one onlooker and the onlooker gaze location of at least one onlooker is a location on the display. In this example, device 100 may determine that the display content is not to be visually encrypted when the onlooker information indicates the presence of one or more potential onlookers within the viewing distance of the display, but that none of the potential onlookers are currently viewing the display.

More generally, device 100 may determine whether to visually encrypt the some or all of the display based on the user context and/or the user position (e.g., as determined using one or more images from one or more cameras of the device such as camera 105). The user context may include the environment in which the primary user (e.g., identified by facial recognition or other authentication operation(s)) is operating the device and/or the content (e.g., applications) being displayed. For example, device 100 may determine that the display should be visually encrypted when the device is being operated in an environment that is a public space (e.g., a shopping mall, a public transportation vehicle, an airport, a train station, etc.).

Device 100 may determine that the device is being operated in a public space based on the number of potential onlookers identified in the field of view of camera 105 and/or other cameras of the device. Device 100 may also determine that the device is being operated in a public space based on a WiFi signal or other wireless signal that includes location information associated with a public space (e.g., WiFi signals from an airport public WiFi network, another location-associated network, or an open or unsecured network). Device 100 may also determine that the device is being operated in a public space when the device is outside a geofence set by the user (e.g., within a range of a beacon or wireless network associated with the primary user's home and/or work location). Device 100 may also determine that display content should be visually encrypted even when only a single potential onlooker is identified, if the potential onlooker is within a predetermined distance and/or a predetermined viewing angle relative to display 104 and/or relative to the line of sight of the primary user (e.g., as determined using camera(s) 105).

Device 100 may also determine that some or all of the display should be visually encrypted based on the content being displayed. For example, device 100 may set a display encryption level based on whether and what private content is being displayed. For example, device 100 may determine that unencrypted display content should be provided when public web-based information is being displayed or a movie is being watched (e.g., using a non-secure application such as a web browser or a movie viewer) and may determine that gaze-dependent display encryption should be provided at various privacy levels when increasingly private information is being displayed (e.g., at a first privacy level that may correspond to a user's photo album and a second, higher, privacy level that may correspond to user-identified private content, email content displayed with an email application or from an email-associated web address, health-related content, and/or financial content such as content displayed using a banking application).

Some privacy levels may include only software-level visual encryption and/or some privacy levels may include hardware-level encryption. Hardware-level encryption may include dimming (e.g., reducing luminance) or washing out (e.g., reducing transparency) of some or all of the display using a switchable display layer such as a switchable diffuser, a switchable retarder, or a switchable micro-louver disposed adjacent or between one or more display layers (e.g., polarizer layers, backlight layers, LCD layers, color filter layers, cover layers, thin-film-transistor layers, etc.) and operable to modify the display light passing therethrough locally or across the entire display.

For example, device 100 may identify a first privacy level that provides a software-based visual encryption as described above in connection with FIGS. 3-9 to be applied when the primary user is viewing the display, and may determine that hardware-based visual encryption should be added to the software-based encryption, or should replace the software-based encryption, to provide a second (higher) level of encryption if the primary user looks away or moves away from the display and/or if an onlooker gaze location coincides with a clear-display portion 204 of a gaze-based software encrypted display (e.g., at or near the user's gaze location). Device 100 may identify a return of the primary user or a return of the primary user's gaze to the display and determine that the display operation should revert to the previous level of privacy.

A virtual or physical button may be provided on display 104 or a keyboard of device 100 that allows the user to enable or disable visual encryption. Device 100 may store context information such as environment and/or content information associated with user enable/disable selections for visual encryption and may learn user preferences so that the next time the user operates the device in a particular location and/or to view particular content, the privacy level last used (or a most commonly used or machine-learned privacy level) for that context can be applied.

If it is determined, at block 1004, that the display content is not to be visually encrypted (e.g., because there are no potential onlookers or no potential onlookers are currently viewing the display), device 100 proceeds to block 1006 at which the display content is displayed unmodified for clear display (e.g., by generating and displaying display frames directly corresponding to the display content, without visual modification).

If it is determined, at block 1006, that the display content is to be visually encrypted (e.g., because there are potential onlookers or one or more potential onlookers are currently viewing the display), device 100 proceeds to block 1008 at which the device identifies at least one of a user gaze location of the user or an onlooker gaze location of an onlooker associated with the onlooker information.

Identifying the user gaze location or onlooker gaze location may include capturing one or more images of the user or onlooker with one or more cameras such as camera 105, identifying the user's or onlooker's eyes, determining the distance of the user's or onlooker's eyes from the display, determining a direction of the user's or onlooker's gaze based on the identified eyes, and determining the location of the user's or onlooker's gaze based on the determined direction and distance. The user gaze location may, for example, correspond to a location of a pixel or group of pixels on the display.

At block 1010, device 100 provides a gaze-dependent visually encrypted display frame for display by the array of display pixels based on at least one of the user gaze location or the onlooker gaze location. For example, the gaze-dependent visually encrypted display frame may include a clear-display region 204, an obscured region 206, and/or a transition region 302 as described above in connection with any of FIGS. 3-8. In some scenarios, a visual, audio, and/or tactile alert may be provided by the device to let the user know whenever an onlooker and/or bystander is detected (e.g., by detection of a face or a point of regard of the onlooker(s) and/or by detection of the onlooker's gaze location) in combination with, or in place of, visual encryption. As another particular example, the gaze-dependent visually encrypted display frame may be visually encrypted at the onlooker gaze location as described in further detail hereinafter in connection with FIG. 11.

Figure 11:
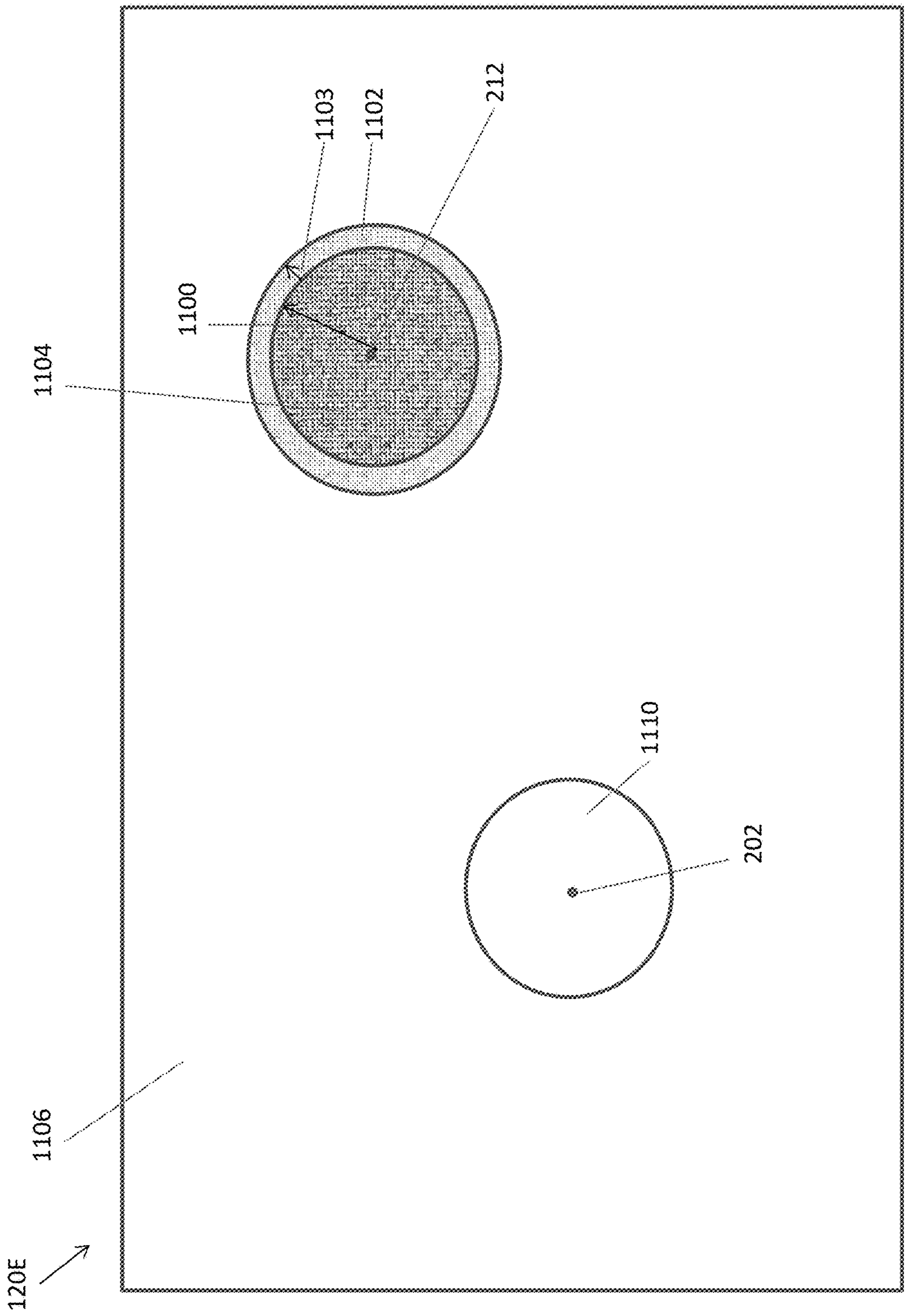
FIG. 11 illustrates an example of a gaze-dependent visually encrypted display frame generated based on an onlooker gaze location in accordance with various aspects of the subject technology.

As shown in the example of FIG. 11, gaze-dependent visually encrypted display frame 120E may include an obscured region 1104 within a distance 1100 of onlooker gaze location 212, and a clear-display region 1106 outside of that distance 1100. In this example, the location and/or size of obscured region 1104 moves and/or changes with changes in the onlooker gaze location 212 and/or the onlooker's distance from display 104. In this example, an exclusion region 1110 may be provided around (e.g., extending an additional distance 1103 around) user gaze location 202 that prevents overlap of obscured region 1104 and exclusion region 1110. In this example, a visible, tactile, and/or audible alert may be provided by device 100 if obscured region 1104 is approaching exclusion region 1110. Obscured region 1104 may be obscured using one or more of the operations described herein that mitigate distractions to the user by the obscuration (e.g., using text scrambling operations, perceptual metamer operations, diffeomorphic warping operations, and/or any other image/video processing operations which obscure the content in region 1104 while keeping the style of that region relatively intact). In other examples, the obscured region 1104 around the onlooker gaze location 212 may be modified in a way that is noticeable to the user (e.g., dimming of that region or simple blurring of that region) so that region 1104 itself serves as an alert to the user.

In this example, a transition region 1102 is provided in which the amount (e.g., weighting) of the visual encryption decreases with increasing distance from the onlooker gaze location 212, though examples in which no transition region 1102 is provided are contemplated.

In another example, a first privacy level (e.g., for photo viewing) may include hardware-based dimming of the display and a second privacy level (e.g., for email, financial, or health information) may include gaze-dependent text scrambling, perceptual metamer, and/or diffeomorphic warping operation as described herein. It should also be appreciated that hardware-based operations only, or other combinations of hardware and software-based visual encryption may be used to perform local gaze-based visual encryption as described herein, in various implementations.

In some operational scenarios, device 100 may employ various combinations of software-based and hardware-based visual encryption and/or various privacy levels even within a single display frame. For example, hardware or software-based dimming of video content may be applied when the user's eyes move away from the video display application to a financial application, and the financial application display can be visually encrypted using gaze-dependent text scrambling, perceptual metamers, and/or diffeomorphic warping operations as described herein.

Figure 12:
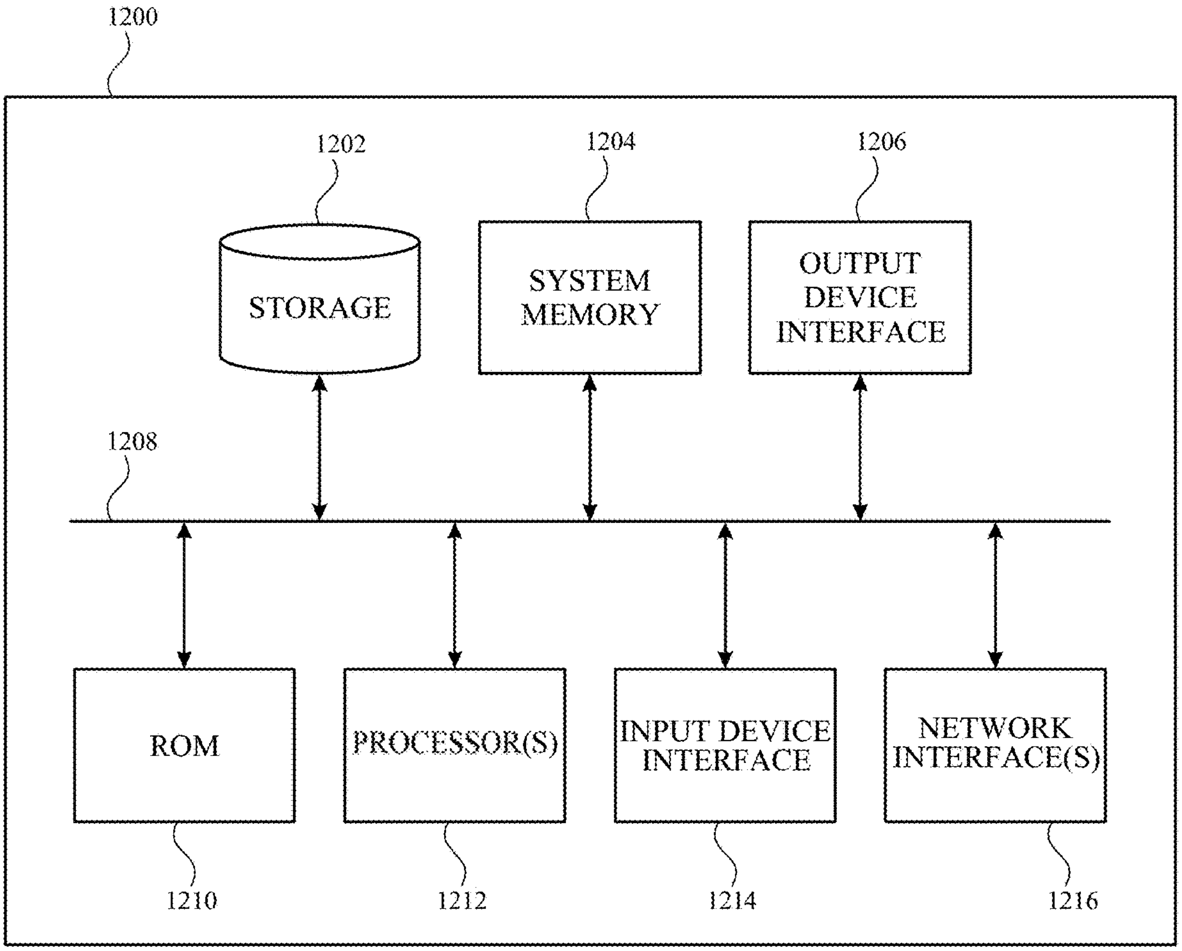
FIG. 12 illustrates an electronic system with which one or more implementations of the subject technology may be implemented.

FIG. 12 illustrates an electronic system 1200 with which one or more implementations of the subject technology may be implemented. The electronic system 1200 can be, and/or can be a part of, electronic device 100 shown in FIG. 1. The electronic system 1200 may include various types of computer readable media and interfaces for various other types of computer readable media. The electronic system 1200 includes a bus 1208, one or more processing unit(s) 1212, a system memory 1204 (and/or buffer), a ROM 1210, a permanent storage device 1202, an input device interface 1214, an output device interface 1206, and one or more network interfaces 1216, or subsets and variations thereof.

The bus 1208 collectively represents all system, peripheral, and chipset buses that communicatively connect the numerous internal devices of the electronic system 1200. In one or more implementations, the bus 1208 communicatively connects the one or more processing unit(s) 1212 with the ROM 1210, the system memory 1204, and the permanent storage device 1202. From these various memory units, the one or more processing unit(s) 1212 retrieves instructions to execute and data to process in order to execute the processes of the subject disclosure. The one or more processing unit(s) 1212 can be a single processor or a multi-core processor in different implementations.

The ROM 1210 stores static data and instructions that are needed by the one or more processing unit(s) 1212 and other modules of the electronic system 1200. The permanent storage device 1202, on the other hand, may be a read-and-write memory device. The permanent storage device 1202 may be a non-volatile memory unit that stores instructions and data even when the electronic system 1200 is off. In one or more implementations, a mass-storage device (such as a magnetic or optical disk and its corresponding disk drive) may be used as the permanent storage device 1202.

In one or more implementations, a removable storage device (such as a floppy disk, flash drive, and its corresponding disk drive) may be used as the permanent storage device 1202. Like the permanent storage device 1202, the system memory 1204 may be a read-and-write memory device. However, unlike the permanent storage device 1202, the system memory 1204 may be a volatile read-and-write memory, such as random access memory. The system memory 1204 may store any of the instructions and data that one or more processing unit(s) 1212 may need at runtime. In one or more implementations, the processes of the subject disclosure are stored in the system memory 1204, the permanent storage device 1202, and/or the ROM 1210. From these various memory units, the one or more processing unit(s) 1212 retrieves instructions to execute and data to process in order to execute the processes of one or more implementations.

The bus 1208 also connects to the input and output device interfaces 1214 and 1206. The input device interface 1214 enables a user to communicate information and select commands to the electronic system 1200. Input devices that may be used with the input device interface 1214 may include, for example, alphanumeric keyboards and pointing devices (also called "cursor control devices"). The output device interface 1206 may enable, for example, the display of images generated by electronic system 1200. Output devices that may be used with the output device interface 706 may include, for example, a display such as display 104 of FIG. 1. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 12, the bus 1208 also couples the electronic system 1200 to one or more networks and/or to one or more network nodes, such as the electronic device 115 shown in FIG. 1, through the one or more network interface(s) 1216. In this manner, the electronic system 1200 can be a part of a network of computers (such as a LAN, a wide area network ("WAN"), or an Intranet, or a network of networks, such as the Internet. Any or all components of the electronic system 1200 can be used in conjunction with the subject disclosure.

In accordance with various aspects of the subject disclosure, an electronic device is provided that includes a camera, a display having an array of display pixels for displaying display frames, and processing circuitry. The processing circuitry is configured to receive display content for display for a user, identify a gaze location of the user with the camera, and provide a gaze-dependent visually encrypted display frame for display by the array of display pixels based on the gaze location. The gaze-dependent visually encrypted display frame includes a clear-display region within a distance of the gaze location and including a first portion of the display content that is unmodified for clear display. The gaze-dependent visually encrypted display frame also includes an obscured region outside the distance of the gaze location and including a second portion of the display content that is modified for secure display.

In accordance with other aspects of the subject disclosure, an electronic device is provided that includes a camera, a display having an array of display pixels for displaying display frames, and processing circuitry. The processing circuitry is configured to receive display content for display for a user, obtain onlooker information using the camera, and determine whether to visually encrypt the display content based on the onlooker information.

In accordance with other aspects of the subject disclosure, an electronic device is provided that includes a camera, a display having an array of display pixels for displaying display frames, and processing circuitry. The processing circuitry is configured to receive display content for display for a user, identify an onlooker gaze location, on the display, of an onlooker other than the user with the camera, provide a gaze-dependent visually encrypted display frame for display by the array of display pixels based on the onlooker gaze location. The gaze-dependent visually encrypted display frame includes an obscured region within a distance of the onlooker gaze location and including a first portion of the display content that is modified for secure display, and a clear-display region outside the distance of the onlooker gaze location and including a second portion of the display content that is unmodified for clear display.

Various functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "processor", and "memory" all refer to electronic or other technological devices. These terms exclude people or groups of people. For the purposes of the specification, the terms "display" or "displaying" means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device as described herein for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input.

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some implementations, multiple software aspects of the subject disclosure can be implemented as sub-parts of a larger program while remaining distinct software aspects of the subject disclosure. In some implementations, multiple software aspects can also be implemented as separate programs. Finally, any combination of separate programs that together implement a software aspect described here is within the scope of the subject disclosure. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Some of the blocks may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to", "operable to", and "programmed to" do not imply any particular tangible or intangible modification of a subject, but, rather, are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "example" is not necessarily to be construed as preferred or advantageous over other aspects or design All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include," "have," or the like is used in the description or the claims, such term is intended to be inclusive in a manner similar to the term "comprise" as "comprise" is interpreted when employed as a transitional word in a claim.

What is claimed is:

1. An electronic device, comprising:

a camera;

a display device having an array of pixels for displaying frames; and processing circuitry, configured to:

receive content for display to a user;

identify a gaze location of the user with the camera;

provide a gaze-dependent visually encrypted frame for display by the array of pixels based on the gaze location, wherein the gaze-dependent visually encrypted frame includes:

a clear-region within a distance from the gaze location and including a first portion of the content that is unmodified for clear display; and an obscured region outside the distance from the gaze location and including a second portion of the content that is modified for secure display;

generate the obscured region from the gaze-dependent visually encrypted frame by performing a visual encryption operation that obscures meaning in the second portion of the content and that mitigates visual distraction to the user;

wherein the visual encryption operation includes a text scrambling operation and a diffeomorphic warping operation.

2. The electronic device of claim 1, wherein the processing circuitry is configured to generate the gaze-dependent visually encrypted frame by modifying the second portion of the content and generating a frame for display using the unmodified first portion and the modified second portion of the content.

3. The electronic device of claim 2, wherein the first portion of the content includes first text and the second portion of the content includes second text, and wherein the processing circuitry is configured to modify the second portion of the content by performing a text scrambling operation on the second text.

4. The electronic device of claim 1, wherein the processing circuitry is configured to generate the gaze-dependent visually encrypted frame by receiving a frame for display, the frame for display including the first portion of the content and the second portion of the content, and modifying a portion of the frame for display corresponding to the obscured region.

5. The electronic device of claim 1, wherein the gaze-dependent visually encrypted frame further comprises a transition region extending between the clear region and the obscured region.

6. The electronic device of claim 1, wherein the processing circuitry is configured to determine the distance from the gaze location based on an additional distance between the user and the display.

7. The electronic device of claim 6, wherein the processing circuitry is configured to determine a shape of the clear-display region based on movement from the gaze location.

8. The electronic device of claim 1, wherein the clear region has a size and a shape, each determined based on the first portion of the display content.

9. The electronic device of claim 8, wherein the first portion of the content comprises text and wherein the shape of the clear-region is a horizontally extended shape.

10. The electronic device of claim 8, wherein the first portion of the content comprises scrolling content and wherein the shape of the clear region is a vertically extended shape.

11. The electronic device of claim 1, wherein the processing circuitry is further configured to:

identify a new gaze location of the user, the new gaze location being away from the display; and provide a new gaze-dependent visually encrypted frame that does not include a clear region to the display.

12. The electronic device of claim 1, wherein the processing circuitry is further configured to:

identify an onlooker gaze location of an onlooker other than the user; and generate an alert if the onlooker gaze location is within the clear region.

13. The electronic device of claim 1, wherein the electronic device is a computer, a monitor, a tablet, a wristwatch, a pendant device, a media player, a gaming device, a navigation device, or a television.

14. An electronic device, comprising:

a camera;

a display having an array of pixels for displaying frames; and processing circuitry, configured to:

receive content for display for a user;

obtain onlooker information using the camera; and determine whether to perform a visual encryption operation on the content that obscures meaning of the content, based on the onlooker information;

wherein the visual encryption operation includes a text scrambling operation and a diffeomorphic warping operation.

15. The electronic device of claim 14, wherein the onlooker information includes an indication of a potential onlooker other than the user; and wherein the processing circuitry is configured to:

determine that the content is to be visually encrypted;

identify a gaze location of the user with the camera; and visually encrypt the content by generating a gaze-dependent visually encrypted frame for display by the array of pixels based on the gaze location, wherein the gaze-dependent visually encrypted frame includes:

a clear region within a distance from the gaze location and including a first portion of the content that is unmodified for clear display; and an obscured region outside the distance from the gaze location and including a second portion of the content that is modified for secure display.

16. The electronic device of claim 14, wherein the onlooker information includes an indication of an onlooker, other than the user, having an onlooker gaze location that is on the display, and wherein the processing circuitry is configured to:

determine that the content is to be visually encrypted;

identify a gaze location of the user with the camera; and visually encrypt the content by generating a gaze-dependent visually encrypted frame for display by the array of pixels based on the gaze location, wherein the gaze-dependent visually encrypted frame includes:

a clear-display region within a distance from the gaze location and including a first portion of the content that is unmodified for clear display; and an obscured region outside the distance from the gaze location and including a second portion of the content that is modified for secure display.

17. The electronic device of claim 14, wherein the onlooker information includes an indication of an onlooker, other than the user, having an onlooker gaze location that is away from the display, and wherein the processing circuitry is configured to determine that the content is not to be visually encrypted.

18. The electronic device of claim 14, wherein the onlooker information includes an indication that there are no potential onlookers in the field of view of the camera, and wherein the processing circuitry is configured to determine that the content is not to be visually encrypted.

19. The electronic device of claim 14, wherein the electronic device is a computer, a monitor, a tablet, a wrist-watch, a pendant device, a media player, a gaming device, a navigation device, or a television.

20. An electronic device, comprising:

a camera;

a display device having an array of pixels for displaying frames; and processing circuitry, configured to:

receive content for display for a user;

identify an onlooker gaze location, on the display, of an onlooker other than the user with the camera; and provide a gaze-dependent visually encrypted frame for display by the array of pixels based on the onlooker gaze location, wherein the gaze-dependent visually encrypted frame includes:

an obscured region within a distance of the onlooker gaze location and including a first portion of the content that is modified for secure display; and a clear region outside the distance of the onlooker gaze location and including a second portion of the content that is unmodified; wherein the first portion of the content has undergone a visual encryption operation that includes a diffeomorphic warping operation.

* * * * *